United States Patent
Lantermann

(10) Patent No.: US 7,215,756 B2
(45) Date of Patent: May 8, 2007

(54) UTILIZATION OF A LOCAL EXCHANGE NETWORK BY A PLURALITY OF LOCAL NETWORK OPERATORS

(75) Inventor: Juergen Lantermann, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 326 days.

(21) Appl. No.: 10/221,143

(22) PCT Filed: May 15, 2001

(86) PCT No.: PCT/DE01/01835

§ 371 (c)(1),
(2), (4) Date: Dec. 9, 2002

(87) PCT Pub. No.: WO01/89230

PCT Pub. Date: Nov. 22, 2001

(65) Prior Publication Data

US 2003/0190033 A1 Oct. 9, 2003

(30) Foreign Application Priority Data

May 15, 2000 (DE) ................................ 100 23 824

(51) Int. Cl.
H04M 3/00 (2006.01)
H04M 5/00 (2006.01)
(52) U.S. Cl. ...................................... 379/242; 379/243

(58) Field of Classification Search ................ 379/242, 379/243, 244, 245, 246, 251, 254, 219, 220.01, 379/221.01, 201.01, 207.01, 229, 230
See application file for complete search history.

(56) References Cited

U.S. PATENT DOCUMENTS

| 5,539,817 | A | * | 7/1996 | Wilkes ...................... 379/230 |
| 5,574,783 | A | | 11/1996 | Dunn |
| 6,256,380 | B1 | * | 7/2001 | Berkowitz et al. .......... 379/243 |
| 6,594,352 | B1 | * | 7/2003 | Smith ..................... 379/114.01 |
| 2004/0013261 | A1 | * | 1/2004 | Huttel et al. |

FOREIGN PATENT DOCUMENTS

| EP | 0 783 221 A2 | 7/1997 |
| EP | 0 817 512 A2 | 1/1998 |
| WO | WO 00/44153 | 7/2000 |

* cited by examiner

Primary Examiner—William J. Deane, Jr.
(74) Attorney, Agent, or Firm—Morrison & Foerster LLP

(57) ABSTRACT

The invention relates to an exchange for connecting telecommunications terminals of subscribers to a telecommunications network, comprising subscriber lines via which the respective telecommunications terminals are linked with the exchange. Said exchange is operated by a first network operator and is used by further network operators. The subscriber lines and subscribers are associated with one of said network operators each and the subscribers select the exchange via the telecommunications terminals to establish a telecommunications link via the respective network operator. The invention further relates to a method for operating an exchange that is used in the inventive exchange.

18 Claims, 3 Drawing Sheets

UTILIZATION OF A LOCAL EXCHANGE NETWORK BY A PLURALITY OF LOCAL NETWORK OPERATORS

CLAIM FOR PRIORITY

This application claims priority to International Application No. PCT/DE01/01835 which was published in the German language on Nov. 22, 2001.

TECHNICAL FIELD OF THE INVENTION

The present invention relates to a switching center for connecting telecommunications terminals to a telecommunications network, and to a method for operating a switching center.

BACKGROUND OF THE INVENTION

After deregulation of the telecommunications market in many countries, new network operators are constantly appearing on the market, who for the time being are acting as carriers for long-distance connections and are attempting to take traffic away from the former monopoly and from their competitors with inexpensive long-distance rates. Usually, these carriers are dialed individually (call by call) for each call, by means of a so-called carrier access code, by consumers. A prerequisite for accepting long-distance traffic is switch-through contracts between the new network operators and the network operator with whom the subscribers are physically connected, in most cases the former monopoly.

However, the new network operators are also increasingly penetrating the local sector, and are attempting to bind consumers to them with fixed contracts and lucrative conditions. These customers (subscribers) are then permanently attached to the new network operator through "preselection" in the local switching centers with which they are physically connected. For these subscribers, the new network operator generally enters into switch-through contracts with the operators of the local switching centers but leaves the actual control of functions (features) to the operators of the local switching centers.

If the new network operator wants to get to the subscriber lines directly, it must make additional arrangements with the operator of the local switching center, in some manner, in that the network operator taps the subscriber lines directly at the main distribution frame and manages a separate local switching center.

This has the disadvantage, for a new network operator, that a separate switching center in the local network sector has to be provided for the network operator's customers, and this involves a high level of investment.

SUMMARY OF THE INVENTION

The present invention provides a switching center, and a method used in the switching center, in which the use of a switching center by several network operators is made possible.

In accordance with one embodiment of the present invention, a technical solution is indicated such as that achieved with modern switching centers currently in use (e.g., in the EWSD, elektronisches Wählsystem digital [electronic dialing system, digital]), so that a switching center (e.g., a local switching center) can be used by several network operators.

Assignment of each subscriber or each subscriber connection line to one network operator according to the invention provides the following advantages both for the operator (first network operator) of the switching center and for the other network operators who use the equipment of the switching center:

The operator gains additional sources of income by selling switching center capacity and telecommunications services.

The network operators who use the capacity of a switching center of the first network operator, on the other hand, have the advantage that investment costs needed to offer telecommunications services to a subscriber in the local network sector are lower, which in turn means an earlier recovery of their investment.

Finally, customers (subscribers) have the advantage that they can select the network operator who offers them the best price and/or service.

In one embodiment of the present invention, several switching centers are connected by way of first intermediate exchange lines. The first intermediate exchange lines or bundles of first intermediate exchange lines are also assigned to a network operator. In this connection, each network operator can handle the telecommunications connections of its subscribers either by way of its own first intermediate exchange lines or, if the network operator has entered into appropriate switch-through agreements with other network operators, by way of the first intermediate exchange lines of the corresponding network operators.

In one aspect of the invention, the telecommunications connections between two subscribers are handled by way of the first intermediate exchange lines, if the subscribers are connected to different switching centers. However, if the subscribers are connected to the same switching center, the telecommunications connection can also be handled as an internal connection within the switching center.

In another embodiment of the present invention, the switching center is connected with a switching center that performs as an interconnect gateway by way of second intermediate exchange lines. The interconnect gateway has the task of bringing about the transition of a telecommunications connection from one network operator to another network operator.

The transition of a telecommunications connection from one network operator to another network operator can also take place within the switching center according to the invention.

According to still another embodiment of the invention, the control of functions that relate to the telecommunications connection takes place as a function of the network operator to whom the subscriber in question is assigned in the switching center. This control takes place in one preferred embodiment by means of a central control device.

The central control device controls the routing and the call rate registration (calculation of fees), for example, as a function of the network operator to whom each subscriber is assigned in the switching center.

In this connection, the central control device performs the control of the functions based on the switching center functions "origination dependent routing" and "origination dependent zoning" for call rate registration.

It is preferable if the switching center according to the invention is administered by the first network operator. This means that an administrator has access to the central control device of the switching center, via an operating terminal, in order to set up a new subscriber for a certain network operator, for example. Administration takes place, for example, by sending administrative commands (MML commands, man-machine language) to the central control.

Telecommunication is understood to mean both voice communication and data communication. Accordingly, subscriber lines are understood to mean, for example, lines for connecting analog terminals (a/b lines), ISDN terminals (BA, PA lines), which can be switched either as an individual connection or as a multi-device connection (e.g., private branch exchanges), terminals using the xDSL data transmission method or lines for connecting terminals using packet-oriented data transmission methods (e.g., H.323 terminals).

BRIEF DESCRIPTION OF THE DRAWINGS

The present invention is explained in greater detail below using a preferred exemplary embodiment, making reference to the attached drawings, which show.

BRIEF DESCRIPTION OF THE PREFERRED EMBODIMENTS

Figure 1:
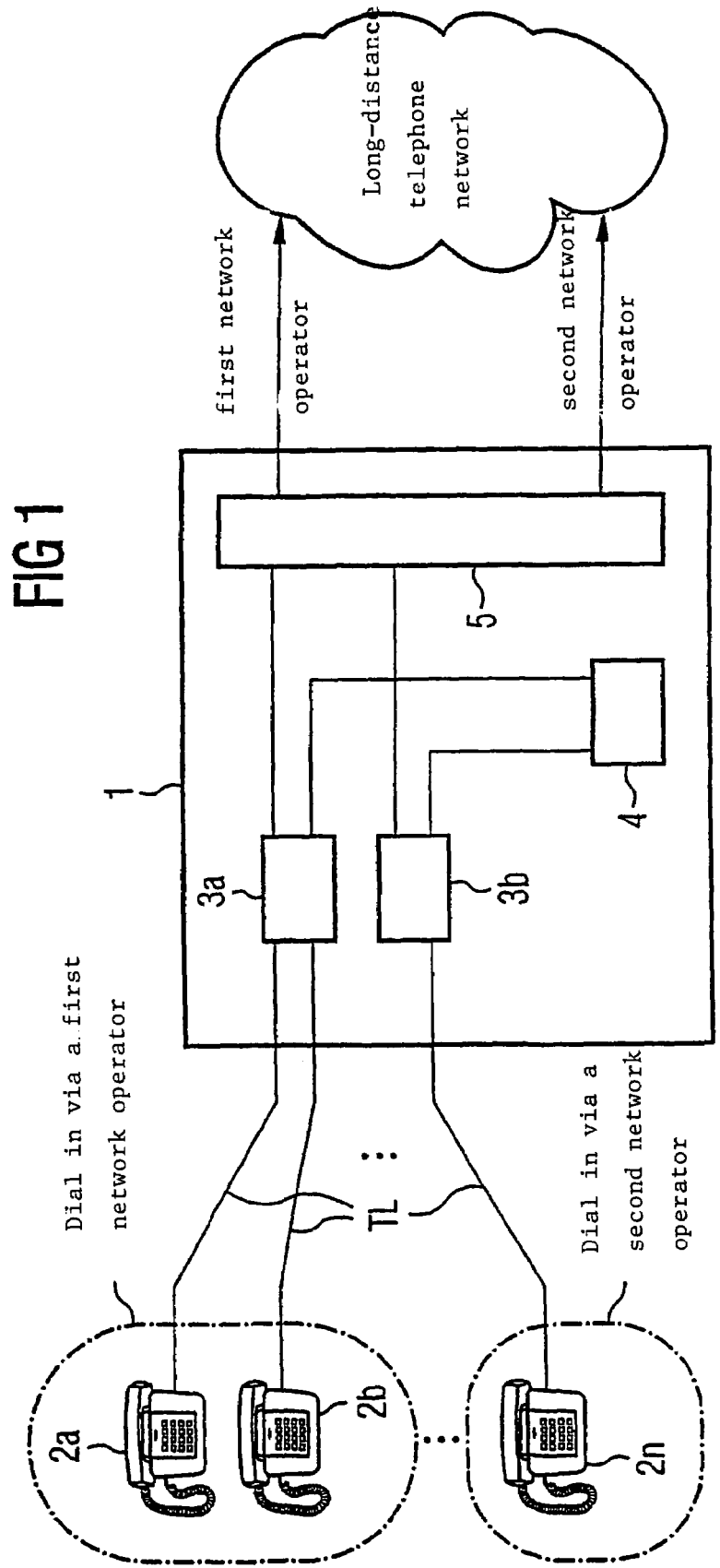
FIG. 1 shows an exemplary structure of the switching center according to the invention.

FIG. 1 shows an example of a switching center 1 according to the invention, which is divided up among several network operators (two, in the example).

A switching center 1 includes, for example, subscriber connection units (also called line cards), which form the interface between the subscriber lines (TL) and the switching center, a coupling network 5, which produces the connection to the telecommunications network, and a central control 4, in which the control device according to the invention is implemented, for example as software. The telecommunications terminals 2a . . . 2n of the subscribers are connected with the switching center 1 by way of the subscriber lines (TL).

The individual subscribers have each entered into agreements with different network operators; i.e., the subscribers each dial into the telecommunications network by way of different network operators. In the example of FIG. 1, the subscribers 2a and 2b dial into the telecommunications network by way of the first network operator, and the subscriber 2n dials in by way of the second network operator.

Control of the telecommunications connection, e.g., the routing and the call rate registration, takes place within the switching center 1 as a function of the network operator by way of which a subscriber dials in. If a subscriber dials into the telecommunications network with the terminal 2a, for example, routing takes place by way of the telecommunications network or the lines of the first network operator or of the network operator with whom switch-through contracts for this purpose exist. Accordingly, the subscriber is billed for charges in accordance with the rate structure of the first network operator.

An advantage of the present invention is that it can be easily integrated into modern switching centers that support the functions "origination dependent routing" and "origination dependent zoning."

Control of the functions that relate to telecommunications connections is carried out by the central control 4. Software implemented in this control recognizes the origin of a telecommunications connection (subscriber, terminal or network operator) and performs the control of the functions accordingly.

Figure 2:
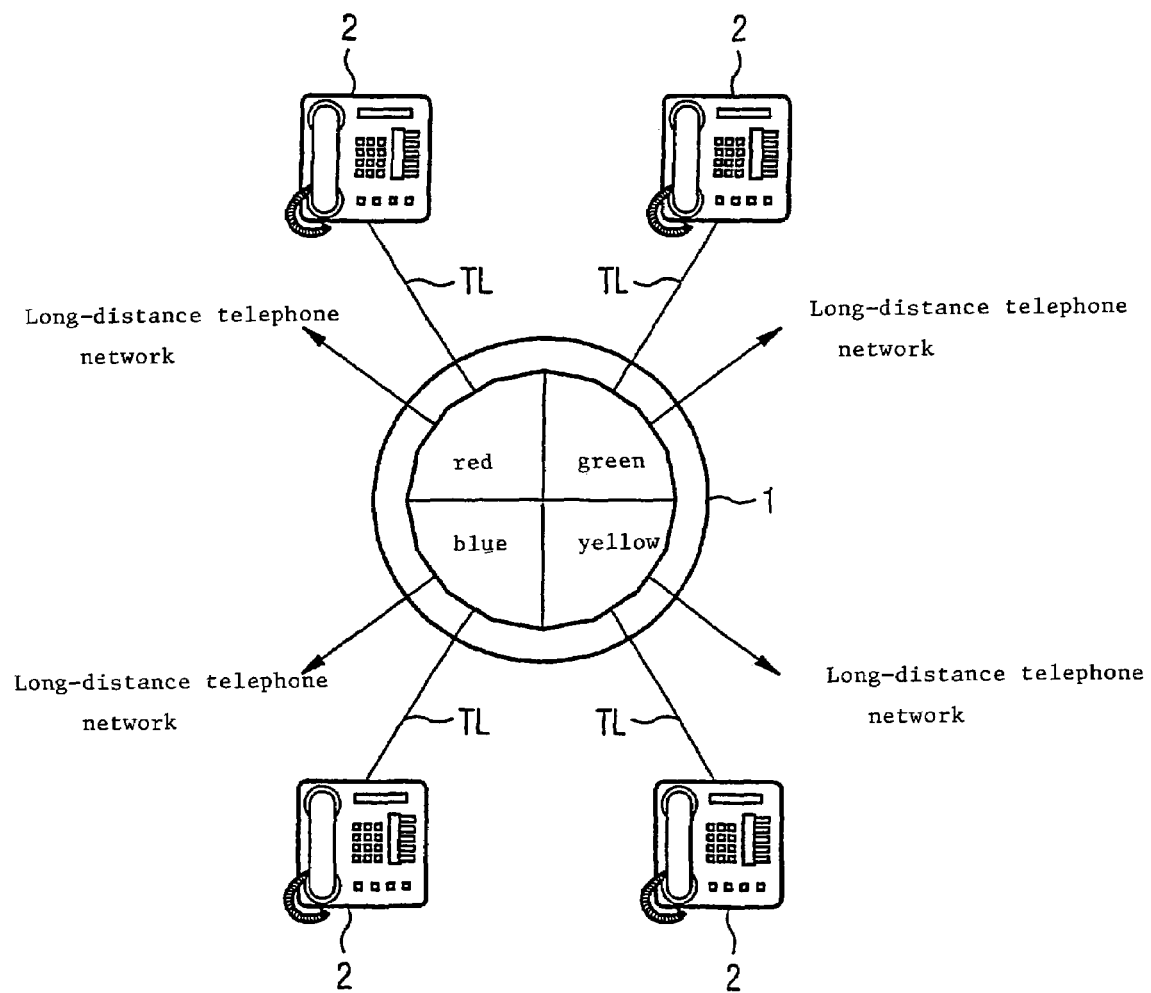
FIG. 2 shows an example of a switching center divided up, with identification of the network operators.

In the following, FIG. 2 is used to show an example in which the switching center 1 is divided up among four network operators.

In this example, the network operators are assigned different colors to differentiate them, and are divided up into a "red," a "green," a "blue" and a "yellow" network operator. Color assignment could also, for example, be used for the subscriber lines (TL) or the subscriber connection units to optically differentiate the connections to the individual terminals 2 of the individual network operators from one another.

In the example shown, each network operator has its own connection paths (lines) in the telecommunications network. If, for example, a subscriber of the "red" network operator wants to make a call, the call is generally connected by way of the lines of the "red" network operator in the telecommunications network. Likewise, in this example the calculation of fees and the connection control (call processing) take place in accordance with the rules of the "red" network operator.

These explanations apply not only to individual telecommunications terminals but also to private branch exchanges of subscribers. A switching center divided up according to the invention offers subscribers the same functionality as a conventional switching center.

According to the present invention, in the example shown, the origin markings (origination dependent routing and zoning) are used to represent the four "colors," as a designation within the system, for the four network operators. Each of these origin markings is set by means of appropriate administrative commands in the central control, and refers to one subscriber line (TL). Every possible origin of a connection therefore carries an origin marking.

It should be noted that dividing up a switching center according to the invention among four network operators merely represents an example; according to the invention, the switching center can be divided up among any desired number of network operators.

Figure 3:
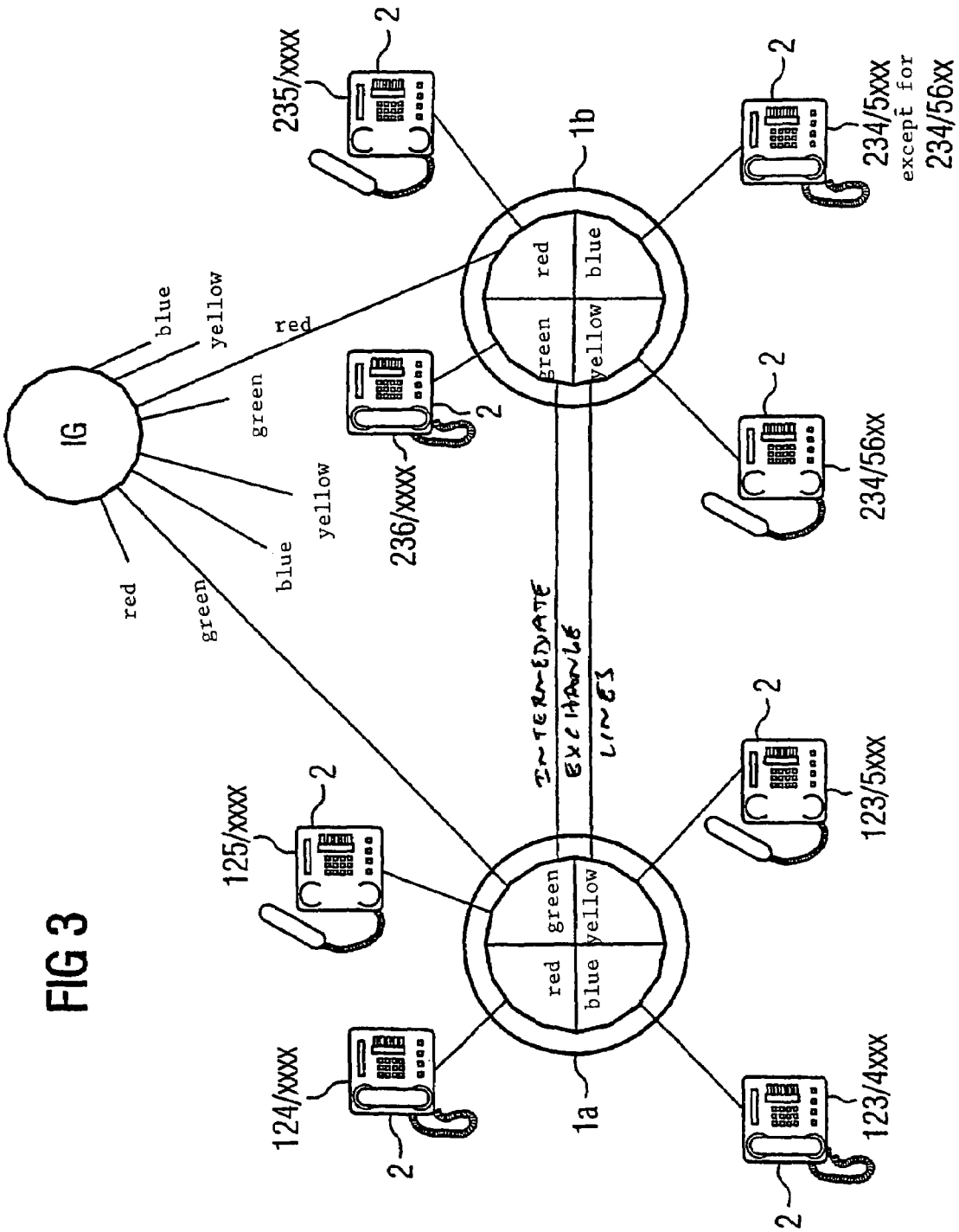
FIG. 3 shows an example of message traffic between various network operators.

In the following, FIG. 3 is used to describe an example of how a telecommunications connection between two subscribers is connected.

If two subscribers of the same network operator (the "yellow" network operator. For example, one subscriber each at switching centers 1a and 1b) are establishing a telecommunications connection, the connection is made directly between the two switching centers 1a and 1b via the telecommunications network of the "yellow" network operator.

However, if a telecommunications connection is made between two subscribers of different network operators, it is advantageous if the connection is made via a so-called interconnect gateway IG. Using the example of FIG. 3, a subscriber of the "green" network operator at the switching center 1a establishes a connection with a subscriber of the "red" network operator at the switching center 1b. The connection then runs from the switching center 1a via the lines of the "green" subscriber to the interconnect gateway IG. The changeover from the lines of the "green" network operator to the lines of the "red" network operator takes place in the interconnect gateway. The connection then continues via the lines of the "red" network operator to the switching center 1b. The connection path via the interconnect gateway enables precise determination from which network operator the telecommunications connection is being established. Then can handling of the connection or of the charges take place, depending on the network operator. For special telephone numbers (such as emergency telephone numbers), it is useful to issue an origin identifier that is valid for all origins. This ensures that the direct connection path is switched for connections from and to such telephone numbers.

FIG. 3 also shows the possibility that certain number ranges can be assigned to the individual network operators. For example, the number range 124/xxx is assigned to the subscribers of the "blue" network operator at the switching center 1*a*.

What is claimed is:

1. A switching center to connect telecommunications terminals of subscribers to a telecommunications network, comprising:

subscriber lines connecting each telecommunications terminal with the switching center, the switching center operated by a first network operator and used by other network operators, each network operator has its own connection paths in the telecommunications network, each subscriber line and each subscriber assigned to one of the network operators, and each subscriber, to establish a telecommunications connection, dialing up the switching center via a respective network operator assigned to a respective subscriber with the telecommunications terminals, wherein the central control device routes the telecommunications connection, based on the network operator to which each subscriber is assigned in the switching center, wherein routing takes place at least partially by way of the connection paths of the network operator, assigned to a respective subscriber.

2. The switching center according to claim 1, further comprising first intermediate exchange lines to connect the switching center with additional switching centers, the intermediate exchange lines assigned to several network operators.

3. The switching center according to claim 2, further comprising second intermediate exchange lines to connect the switching center with one or more additional switching centers, which serve as an interconnect gateway for the transition of a telecommunications connection from the telecommunications network of one network operator to the telecommunications network of another network operator.

4. The switching center according to claim 1, wherein the transition of a telecommunications connection from the telecommunications network of one network operator to the telecommunications network of another network operator takes place in the switching center.

5. The switching center according to claim 1, further comprising a central control device to control functions that relate to the telecommunications connection, based on the network operator to which each subscriber is assigned in the switching center.

6. The switching center according to claim 1, wherein the central control device calculates charges for the telecommunications connection, based on the network operator to which each subscriber is assigned in the switching center.

7. The switching center according to claim 6, wherein the central control device controls functions that relate to the telecommunications connection, based on the switching center functions "origination dependent routing" and "origination dependent zoning."

8. The switching center according to claim 1, wherein the subscriber lines connect analog telecommunications terminals.

9. The switching center according to claim 1, wherein the subscriber lines connect ISDN telecommunications terminals.

10. The switching center according to claim 1, wherein the subscriber lines connect telecommunications terminals for data transmission using xDSL transmission methods.

11. The switching center according to claim 1, wherein the subscriber lines connect telecommunications terminals using packet-oriented transmission methods.

12. A method for operating a switching center to connect telecommunications terminals of subscribers to a telecommunications network having subscriber lines, comprising:

connecting the telecommunications terminal with the switching center;

operating the switching center by a first network operator and used by other network operators;

each network operator has its own connection paths in the telecommunications network assigning each subscriber line and each subscriber to one of the network operators, and the subscribers to establish a telecommunications connection; and dialing up the switching center via a respective network operator assigned to a respective subscriber with the telecommunications terminals, wherein functions that relate to the telecommunications connection are controlled as a function of the network operator to which each subscriber is assigned in the switching center, and routing takes place at least partially by way of the connection paths of the network operator, assigned to a respective subscriber.

13. The method according to claim 12, further comprising routing the telecommunications connection as a function of the network operator to which each subscriber is assigned in the switching center.

14. The method according to claim 12, further comprising calculating charges for the telecommunications connection as a function of the network operator to which each subscriber is assigned in the switching center.

15. The method according to claim 12, wherein control of the functions that relate to the telecommunications connection is performed on the basis of the switching center functions "origination dependent routing" and "origination dependent zoning."

16. The method according to claim 12, wherein the switching center is administered by the first network operator.

17. The method according to claim 12, wherein the transition of a telecommunications connection from the telecommunications network of one network operator to the telecommunications network of another network operator occurs in the switching center.

18. The method according to claim 12, wherein transition of a telecommunications connection from the telecommunications network of one network operator to the telecommunications network of another network operator occurs via an additional switching center.

* * * * *